US012719220B2

(12) United States Patent
Yamashita et al.

(10) Patent No.: US 12,719,220 B2
(45) Date of Patent: Aug. 25, 2026

(54) BOARD CONNECTOR HAVING OUTER CONDUCTOR ATTACHED TO CONNECTOR HOUSING

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masanao Yamashita, Osaka (JP); Toshifumi Ichio, Osaka (JP); Takuya Okamoto, Osaka (JP); Maika Ido, Osaka (JP); Kazuki Hiramatsu, Osaka (JP); Taiga Kadoyama, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 348 days.

(21) Appl. No.: 18/572,700

(22) PCT Filed: Jun. 13, 2022

(86) PCT No.: PCT/JP2022/023597

§ 371 (c)(1),
(2) Date: Dec. 20, 2023

(87) PCT Pub. No.: WO2023/276630

PCT Pub. Date: Jan. 5, 2023

(65) Prior Publication Data

US 2024/0291209 A1 Aug. 29, 2024

(30) Foreign Application Priority Data

Jul. 2, 2021 (JP) ................................ 2021-110740

(51) Int. Cl.
*H01R 13/6585* (2011.01)
*H01R 13/6594* (2011.01)

(52) U.S. Cl.
CPC ..... *H01R 13/6585* (2013.01); *H01R 13/6594* (2013.01)

(58) Field of Classification Search
CPC ............ H01R 13/6585; H01R 13/6594; H01R 13/6581; H01R 12/716
(Continued)

(56) References Cited

U.S. PATENT DOCUMENTS 5,429,520 A 7/1995 Morlion et al.
5,429,521 A 7/1995 Morlion et al.
(Continued)

FOREIGN PATENT DOCUMENTS

JP 2008-059761 A 3/2008
JP 2017-174515 A 9/2017

OTHER PUBLICATIONS

International Search Report issued on Aug. 30, 2022 for WO 2023/276630 A1 (5 pages).

*Primary Examiner* — Hae Moon Hyeon
(74) *Attorney, Agent, or Firm* — Venjuris, P.C.

(57) ABSTRACT

A board connector to be connected to a circuit board including an electrically conductive path is provided with a connector housing to be connected to a mating connector, a plurality of inner conductors to be mounted into the connector housing and connected to the electrically conductive path of the circuit board, and an outer conductor made of metal to be attached to the connector housing and configured to cover the plurality of inner conductors while being electrically insulated from the plurality of inner conductors. The outer conductor includes two side walls and a partition wall disposed between the two side walls and between the
(Continued)

plurality of inner conductors. Side wall connecting portions to be connected to the electrically conductive path of the circuit board project on lower end parts of the two side walls.

3 Claims, 12 Drawing Sheets

(58) Field of Classification Search
USPC ....... 439/607.11, 79, 607.05, 607.08, 607.13
See application file for complete search history.

(56) References Cited

U.S. PATENT DOCUMENTS

| | | | | |
|---|---|---|---|---|
| 5,433,617 | A | 7/1995 | Morlion et al. | |
| 5,433,618 | A | 7/1995 | Morlion et al. | |
| 5,549,481 | A | 8/1996 | Morlion et al. | |
| 9,389,368 | B1 | 7/2016 | Sharf | |
| 12,401,162 | B2 * | 8/2025 | Hiramatsu | H01R 13/6587 |
| 2002/0102879 | A1 | 8/2002 | Hoshino et al. | |
| 2017/0018867 | A1 | 1/2017 | Kimura et al. | |
| 2018/0366843 | A1 * | 12/2018 | Maki | H01R 24/42 |
| 2022/0102885 | A1 | 3/2022 | Maesoba et al. | |
| 2023/0033546 | A1 * | 2/2023 | Hiramatsu | H01R 13/514 |
| 2024/0421540 | A1 * | 12/2024 | Hung | H01R 13/6581 |
| 2025/0023304 | A1 * | 1/2025 | Akaike | H01R 13/6581 |
| 2025/0047043 | A1 * | 2/2025 | Shirota | H01R 13/502 |
| 2025/0385473 | A1 * | 12/2025 | Tsutsumi | H01R 13/6581 |

* cited by examiner

BOARD CONNECTOR HAVING OUTER CONDUCTOR ATTACHED TO CONNECTOR HOUSING

CROSS REFERENCE TO RELATED APPLICATIONS

This application is a national phase of PCT application No. PCT/JP2022/023597, filed on 13 Jun. 2022, which claims priority from Japanese patent application No. 2021-110740, filed on 2 Jul. 2021, all of which are incorporated herein by reference.

BACKGROUND OF THE INVENTION

Field of the Invention

The present disclosure relates to a board connector.

Description of Related Art

Conventionally, a board connector is known from Japanese Patent Laid-Open Publication No. 2008-059761. This connector is provided with inner conductors to be connected to electrically conductive paths formed on a circuit board, an outer conductor surrounding the inner conductors while being electrically insulated from the inner conductors and a connector housing for accommodating the inner conductors and the outer conductor.

In the above board connector, noise intruding into the inner conductors from the outside of the board connector is suppressed and noise leaking from the inner conductors to the outside of the board connector is also suppressed by surrounding the inner conductors connected to the electrically conductive paths of the circuit board by the outer conductor.

PRIOR ART DOCUMENT

Patent Document

Patent Document 1: JP 2008-059761 A

BRIEF SUMMARY OF THE INVENTION

If the number of the inner conductors increases, so-called crosstalk in which signals leak between a plurality of the inner conductors may occur and communication performance may be reduced. The present disclosure was completed on the basis of the above situation and aims to improve the communication performance of a board connector.

The present disclosure is directed to a board connector to be connected to a circuit board including an electrically conductive path, the board connector being provided with a connector housing to be connected to a mating connector, a plurality of inner conductors to be mounted into the connector housing, the inner conductors being connected to the electrically conductive path of the circuit board, and an outer conductor made of metal to be attached to the connector housing, the outer conductor covering the plurality of inner conductors while being electrically insulated from the plurality of inner conductors, the outer conductor including two side walls and a partition wall disposed between the two side walls and between the plurality of inner conductors, side wall connecting portions to be connected to the electrically conductive path of the circuit board projecting on lower end parts of the two side walls, and a partition wall connecting portion to be connected to the electrically conductive path of the circuit board projecting on a lower end part of the partition wall.

According to the present disclosure, the communication performance of a board connector can be improved.

DETAILED DESCRIPTION OF THE INVENTION

Description of Embodiments of Present Disclosure

Figure 1:
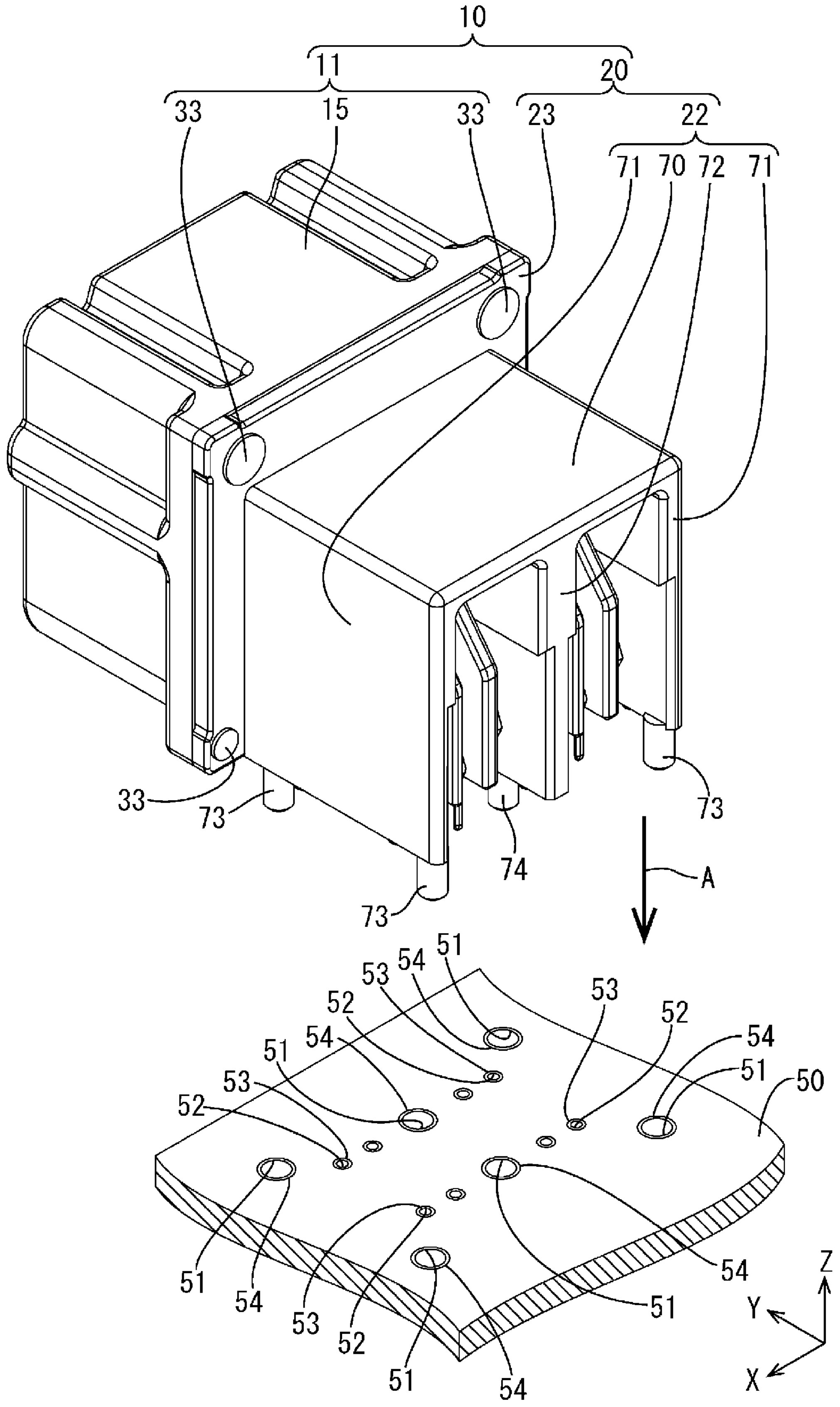
FIG. 1 is a perspective view showing a board connector and a circuit board according to one embodiment.

First, embodiments of the present disclosure are listed and described.

(1) The board connector of the present disclosure is to be connected to a circuit board including an electrically conductive path, and provided with a connector housing to be connected to a mating connector, a plurality of inner conductors to be mounted into the connector housing, the inner conductors being connected to the electrically conductive path of the circuit board, and an outer conductor made of metal to be attached to the connector housing, the outer conductor covering the plurality of inner conductors while being electrically insulated from the plurality of inner conductors, the outer conductor including two side walls and a partition wall disposed between the two side walls and between the plurality of inner conductors, side wall connecting portions to be connected to the electrically conductive path of the circuit board projecting on lower end parts of the two side walls, and a partition wall connecting portion to be connected to the electrically conductive path of the circuit board projecting on a lower end part of the partition wall.

The inner conductors are covered by the side walls connected to the electrically conductive path and the partition wall connected to the electrically conductive path by the partition wall connecting portion connected to the electrically conductive path of the circuit board. Since electromagnetic symmetry among the inner conductors, the side walls and the partition wall is improved in this way, the leakage of signals between the inner conductors partitioned by the partition wall can be suppressed. In this way, the communication performance of the board connector can be improved.

(2) Preferably, each of the plurality of inner conductors includes a board connecting portion to be connected to the electrically conductive path of the circuit board, and the partition wall connecting portion and the board connecting portions are disposed side by side.

By disposing the partition wall connecting portion and the board connecting portions side by side, the symmetry of the partition wall connecting portion and the board connecting portions is improved. In this way, the leakage of signals between the board connecting portions is further suppressed.

(3) Preferably, the plurality of inner conductors form a plurality of inner conductor pairs each composed of two adjacent inner conductors, and the partition wall is disposed between adjacent inner conductor pairs, out of the plurality of inner conductor pairs.

Since the leakage of signals between the adjacent inner conductor pairs is suppressed, the communication performance of the board connector can be further improved.

Details of Embodiments of Present Disclosure

Hereinafter, an embodiment of the present disclosure is described. The present disclosure is not limited to these illustrations, but is represented by claims and intended to include all changes in the scope of claims and in the meaning and scope of equivalents.

Embodiment

One embodiment of the present disclosure is described with reference to FIGS. 1 to 12. A board connector 10 according to this embodiment is mounted on a circuit board 50. In the following description, a Z direction represents an upward direction, a Y direction represents a forward direction, and an X direction represents a leftward direction. Further, for a plurality of identical members, only some members may be denoted by a reference sign and the other members may not be denoted by the reference sign.

[Circuit Board 50]

As shown in FIG. 1, the circuit board 50 is formed with a plurality of (eight in this embodiment) signal through holes 52 and a plurality of (six in this embodiment) ground through holes 51 penetrating through the circuit board 50 in a vertical direction. A signal land 53 (an example of an electrically conductive path), in which a signal is transmitted, is formed on a hole edge part of the signal through hole 52 by printed wiring technique. A ground land 54 (an example of the electrically conductive path) electrically grounded is formed on a hole edge part of the ground through hole 51 by printed wiring technique. Unillustrated electronic components are mounted on the circuit board 50 by a known method such as soldering.

[Board Connector 10]

Figure 2:
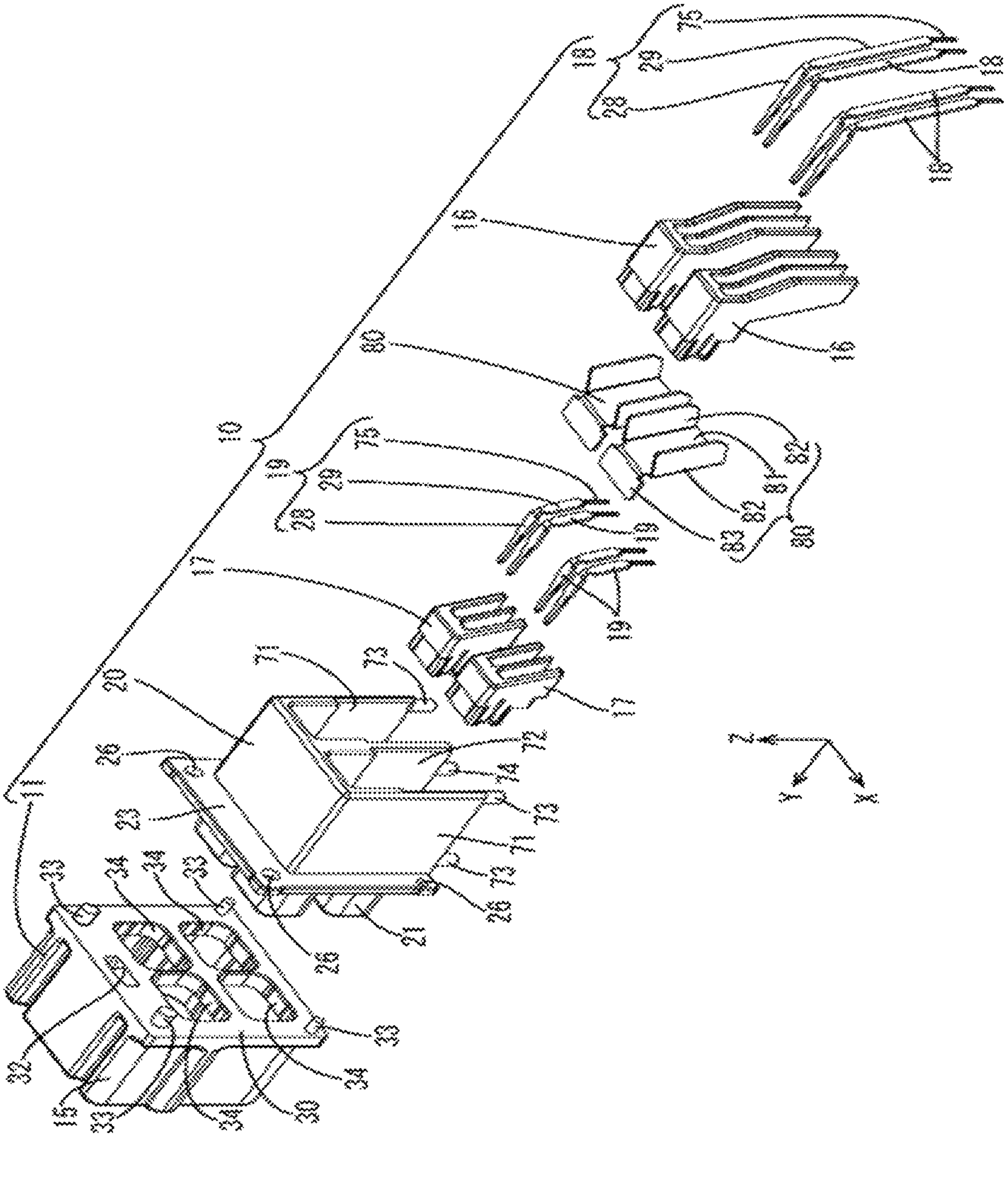
FIG. 2 is an exploded perspective view showing the board connector.

As shown in FIG. 2, the board connector 10 includes a connector housing 11, an outer conductor 20 to be attached to the connector housing 11, upper dielectrics 16 and lower dielectrics 17 to be accommodated into the outer conductor 20, upper inner conductors 18 (an example of inner conductors) to be accommodated into the upper dielectrics 16 and lower inner conductors 19 (an example of the inner conductors) to be accommodated into the lower dielectrics 17.

[Connector Housing 11]

Figure 3:
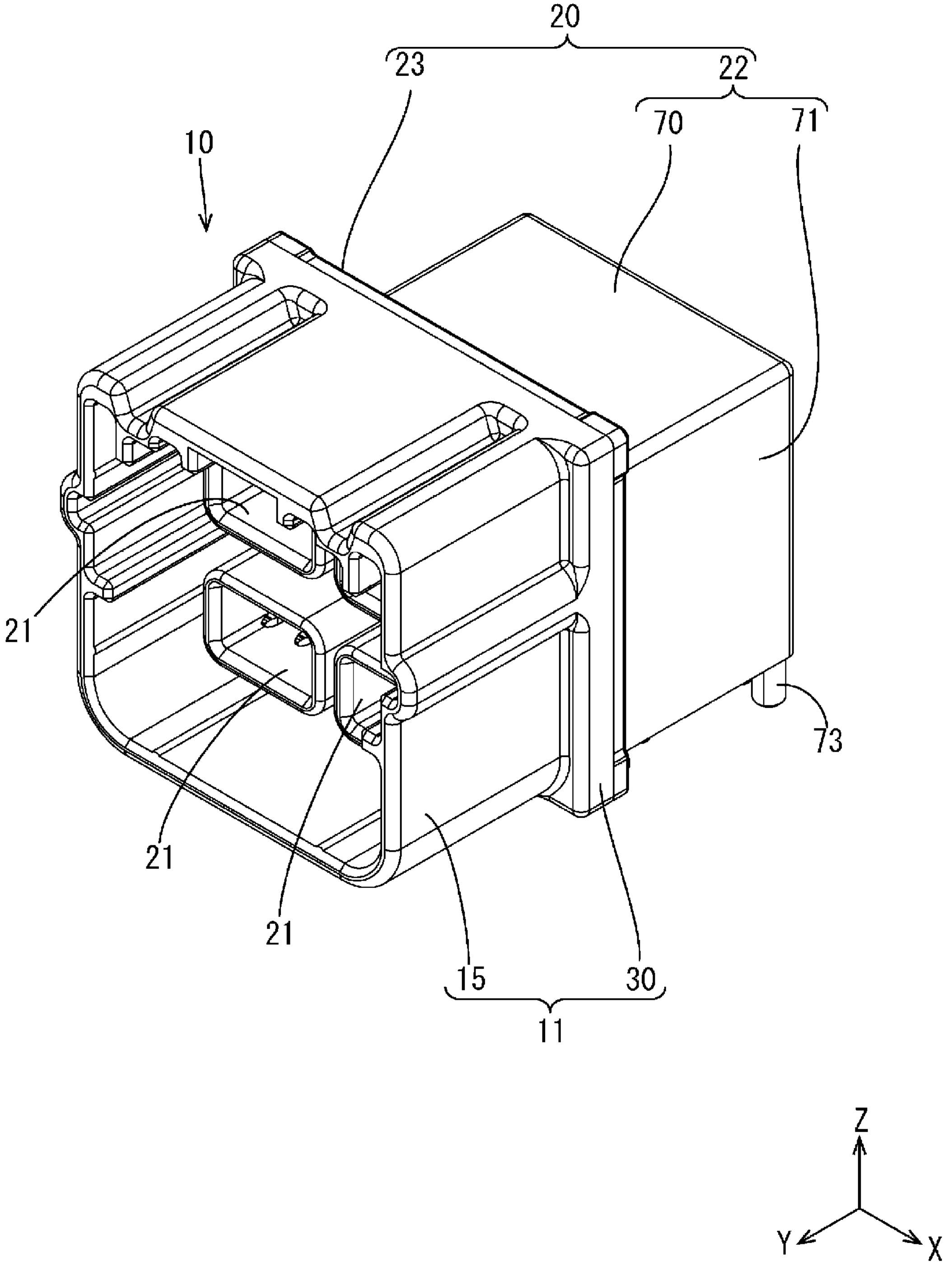
FIG. 3 is a perspective view showing the board connector.
Figure 4:
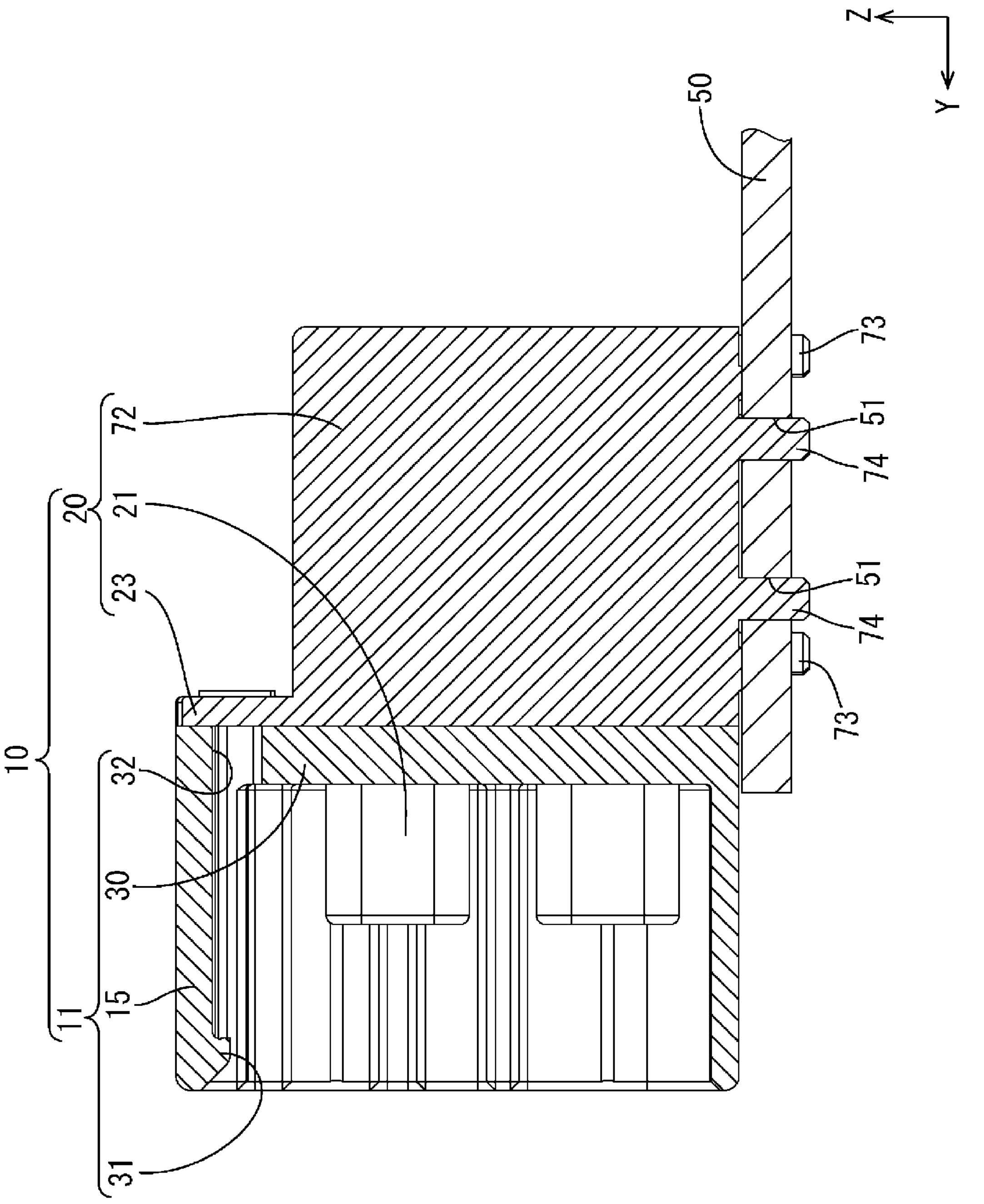
FIG. 4 is a section along IV-IV in FIG. 5.

The connector housing 11 is formed by injection-molding an insulating synthetic resin. As shown in FIG. 3, the connector housing 11 includes a receptacle 15, which is open forward and into which a mating connector (not shown) is fit. As shown in FIG. 4, a back wall 30 is provided on a side of the connector housing 11 opposite to an opening end part of the receptacle 15. A lock portion 31 projecting downward is formed to project downward on the front end edge of the upper wall of the receptacle 15. Although not shown in detail, the lock portion 31 is engaged with the mating connector fit into the receptacle 15, whereby the mating connector is held in the receptacle 15.

As shown in FIG. 2, locking protrusions 33 projecting rearward are formed on four corner parts on the rear surface of the back wall 30. The locking protrusion 33 is formed into a cylindrical shape. The locking protrusions 33 formed near an upper end part of the back wall 30 are formed to have a larger diameter than the locking protrusions 33 formed near a lower end part of the back wall 30.

As shown in FIG. 2, a plurality of (four in this embodiment) tube portion mounting holes 34, into which tube portions 21 of the outer conductor 20 to be described later are inserted, are formed to penetrate through the back wall 30 in the front-rear direction. The tube portion mounting hole 34 has a rectangular cross-sectional shape with rounded corners. Two tube portion mounting holes 34 are formed side by side in a lateral direction in two stages arranged in a vertical direction.

[Outer Conductor 20]

Figure 5:
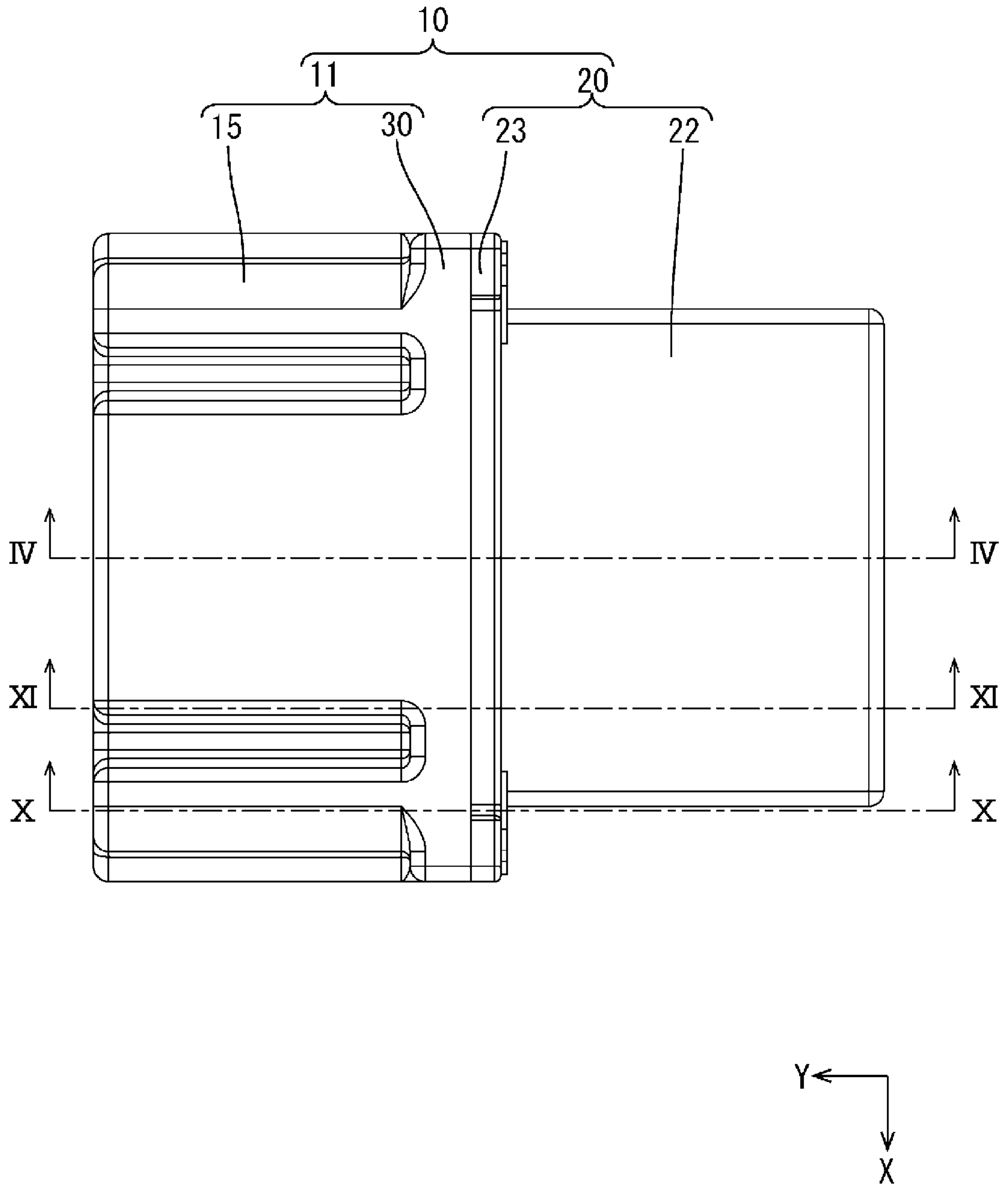
FIG. 5 is a plan view showing the board connector.

As shown in FIG. 5, the outer conductor 20 is attached to a rear part of the connector housing 11. The outer conductor 20 is made of electrically conductive metal. An arbitrary metal such as zinc, copper, copper alloy, aluminum or aluminum alloy can be appropriately selected as a metal for constituting the outer conductor 20. The outer conductor 20 is formed by a known method such as casting, die casting or cutting. The outer conductor 20 is brought into electrical contact with a mating outer conductor (not shown) accommodated in the mating connector.

Figure 6:
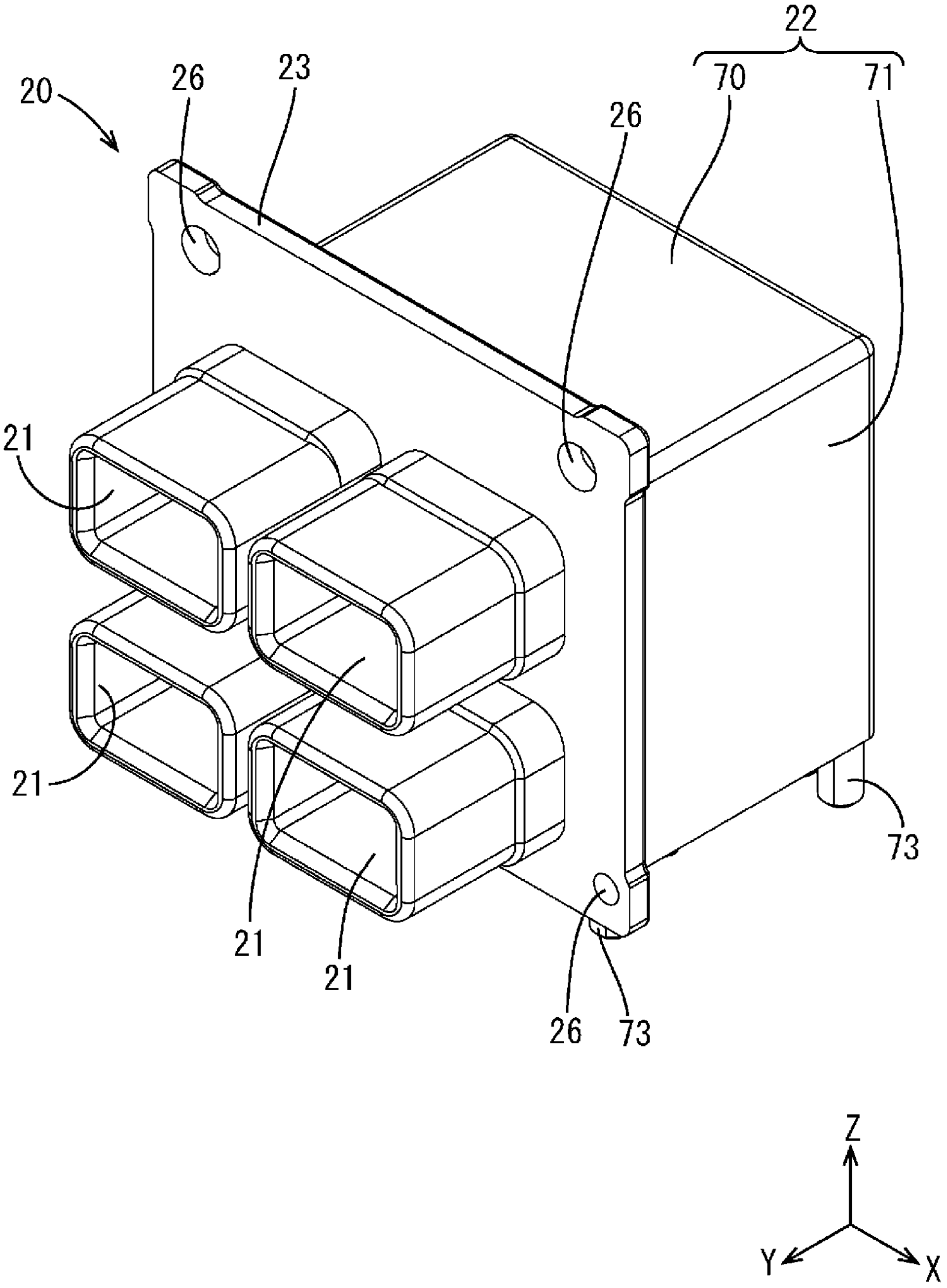
FIG. 6 is a perspective view showing an outer conductor.

As shown in FIG. 6, the outer conductor 20 includes a plurality of (four in this embodiment) tube portions 21 extending in the front-rear direction and having a tubular shape, an inner conductor surrounding portion 22 extending rearward from the rear end edges of the tube portions 21 and a flange 23 projecting in a direction intersecting the front-rear direction on a boundary part between the tube portions 21 and the inner conductor surrounding portion 22.

As shown in FIG. 6, the tube portion 21 has a rectangular cross-sectional shape with rounded corners. The outer shape of the tube portion 21 is set to have the same shape as or be somewhat smaller than the inner shape of the tube portion mounting hole 34 of the back wall 30. In this way, the tube portion 21 is press-fit into the tube portion mounting hole 34 of the connector housing 11.

Figure 7:
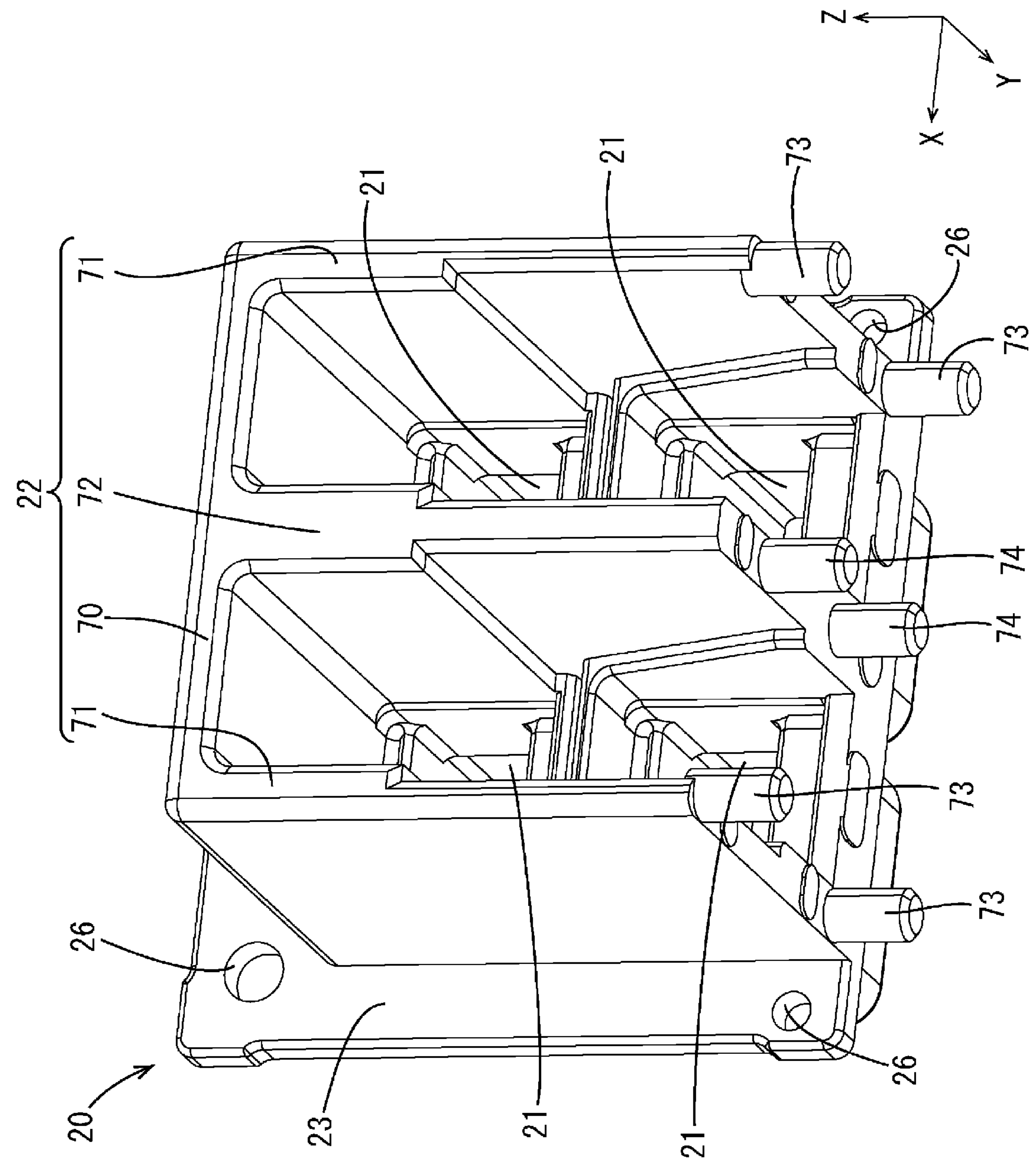
FIG. 7 is a perspective view showing the outer conductor when viewed from a direction different from that in FIG. 6.

As shown in FIG. 7, spaces extending in the front-rear direction are formed inside the tube portions 21. The upper dielectrics 16 and the lower dielectrics 17 to be described later are press-fit into the spaces inside the tube portions 21 and held retained in the tube portions 21.

Figure 8:
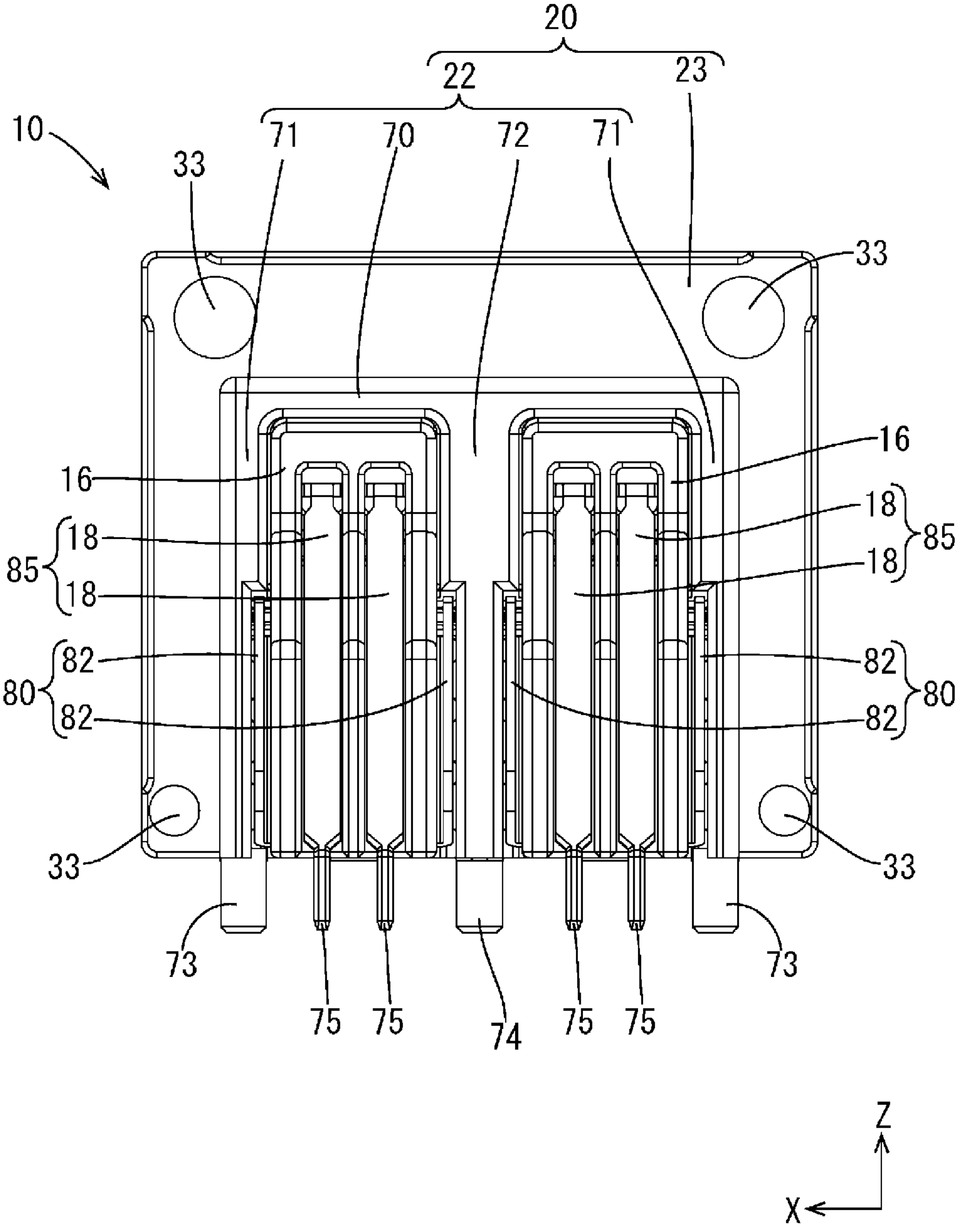
FIG. 8 is a back view showing the board connector.
Figure 9:
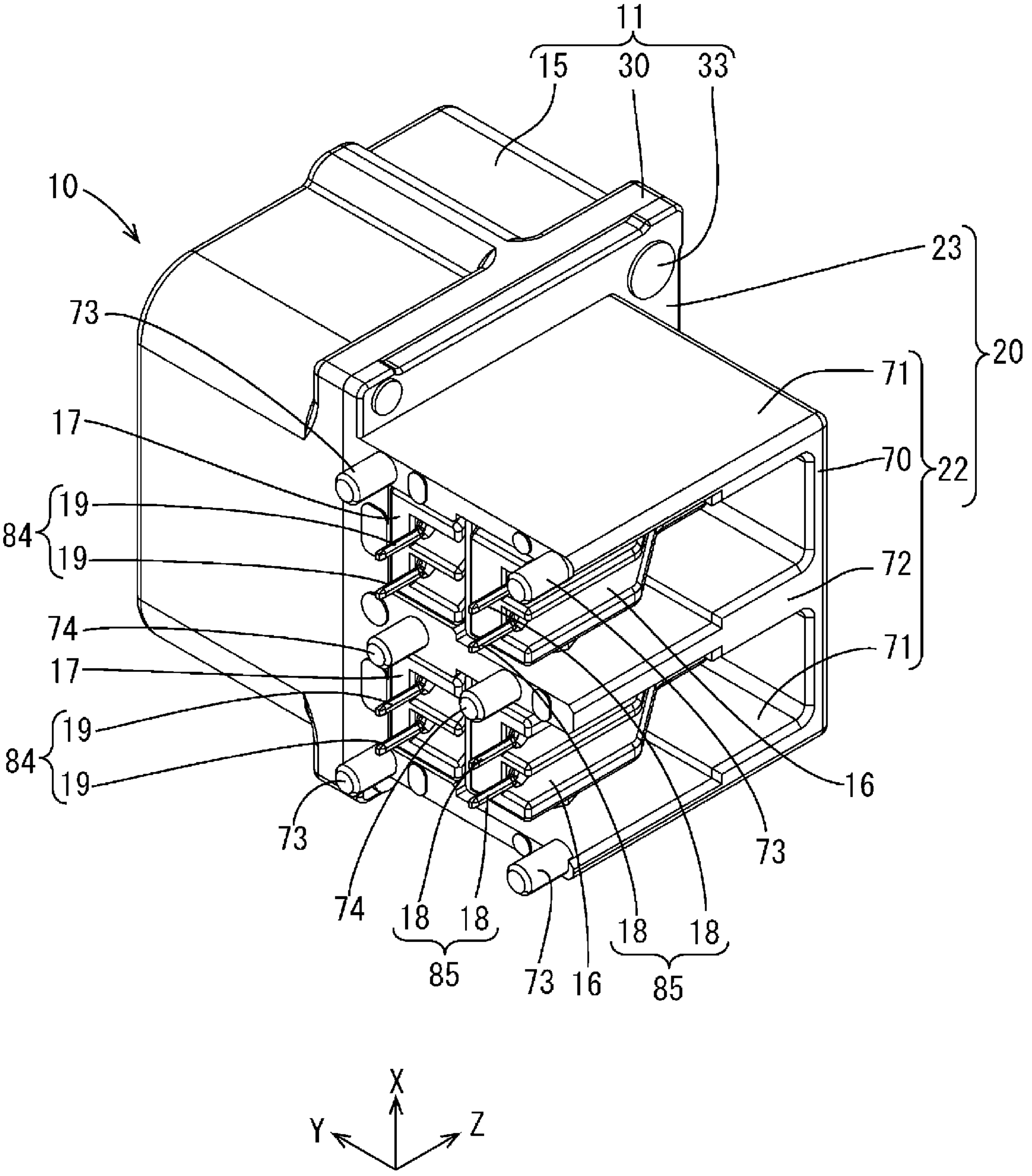
FIG. 9 is a perspective view of the board connector when viewed obliquely from below.

As shown in FIG. 8, the inner conductor surrounding portion 22 is shaped to be open downward when viewed from behind. The inner conductor surrounding portion 22 includes an upper wall 70, two side walls 71 extending downward from both left and right end parts of the upper wall 70 and a partition wall 72 extending downward from a position near a center of the upper wall 70 in the lateral direction. The partition wall 72 is located between the two side walls 71. As shown in FIG. 9, the upper inner conductors 18 and the lower inner conductors 19 to be described later are accommodated inside the inner conductor surrounding portion 22 while being surrounded on upper, right and left sides by the inner conductor surrounding portion 22.

As shown in FIG. 9, a plurality of (four in this embodiment) cylindrical side wall connecting portions 73 projecting downward are respectively provided on lower end parts of the two side walls 71. The side wall connecting portions 73 are passed through the ground through holes 51 of the circuit board 50 and connected to the ground lands 54 formed on the inner surfaces of the hole edge parts of the ground through holes 51 by a known method such as soldering.

As shown in FIG. 9, a plurality of (two in this embodiment) cylindrical partition wall connecting portions 74 projecting downward are provided on a lower end part of the partition wall 72. The partition wall connecting portions 74 are passed through the ground through holes 51 of the circuit board 50 and connected to the ground lands 54 formed on the inner surfaces of the hole edge parts of the ground through holes 51 by a known method such as soldering.

As shown in FIG. 4, with the tube portions 21 press-fit in the tube portion mounting holes 34, the flange 23 is in contact with the rear surface of the back wall 30 from behind. A part of the flange 23 corresponding to a mold removal hole 32 of the back wall 30 closes the mold removal hole 32 from behind.

As shown in FIG. 2, the flange 23 is formed with locking recesses 26 penetrating through the flange 23 in the front-rear direction respectively at positions corresponding to the locking protrusions 33 of the back wall 30. The locking recess 26 has a circular cross-sectional shape. The inner shape of the locking recess 26 is set to be substantially the same as the outer shape of the locking protrusion 33. Substantially the same means a case where two shapes are the same and also a case where the two shapes can be identified as substantially the same even if not being the same.

Figure 10:
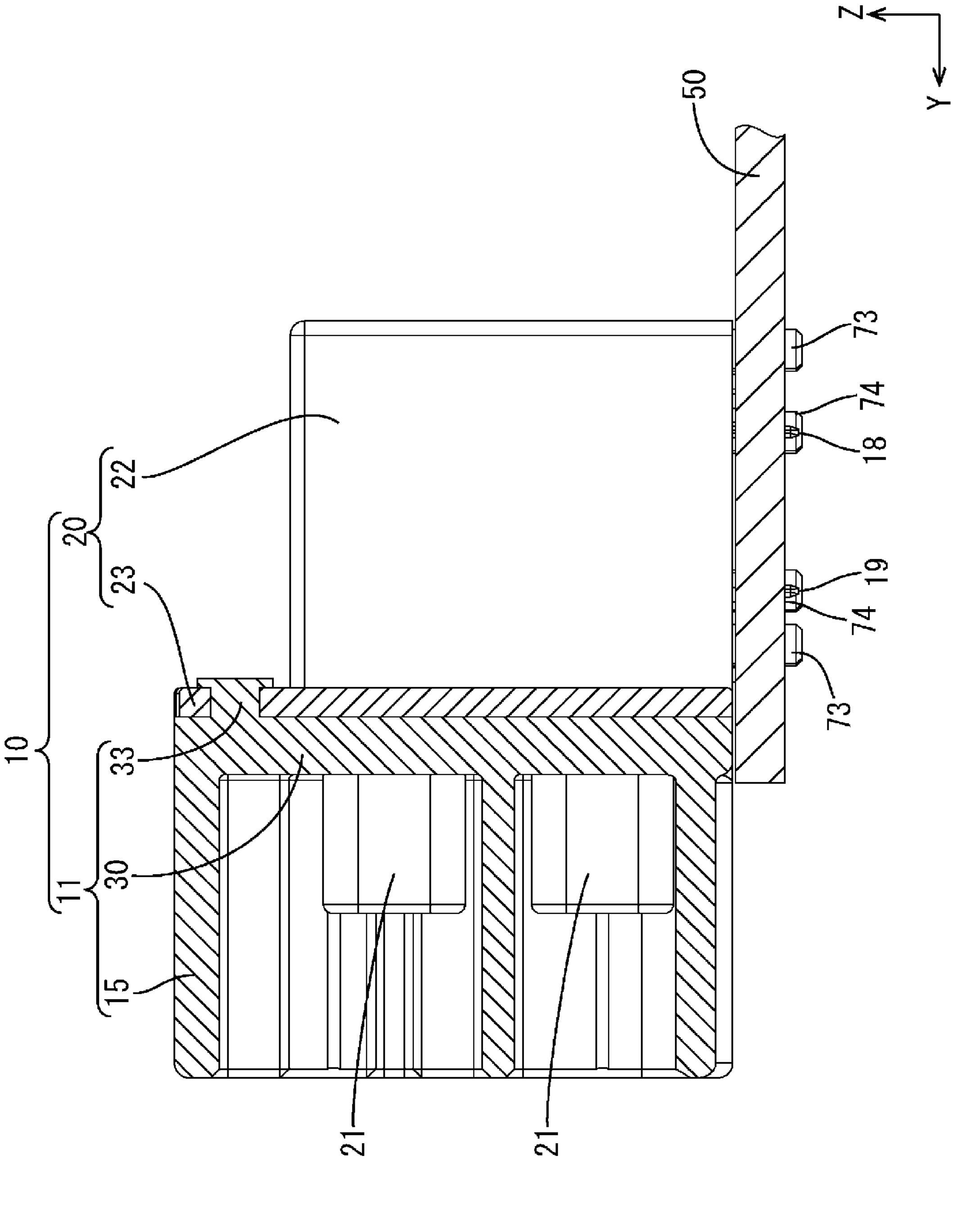
FIG. 10 is a section along X-X in FIG. 5.

As shown in FIG. 10, a rear end part of the locking protrusion 33 is squashed by heating and pressurizing after being passed through the locking recess 26. As a result, an external dimension of the rear end part of the locking protrusion 33 becomes larger than an inner diameter of the locking recess 26, wherefore the locking protrusion 33 is held retained in the locking recess 26.

[Dielectrics]

Figure 11:
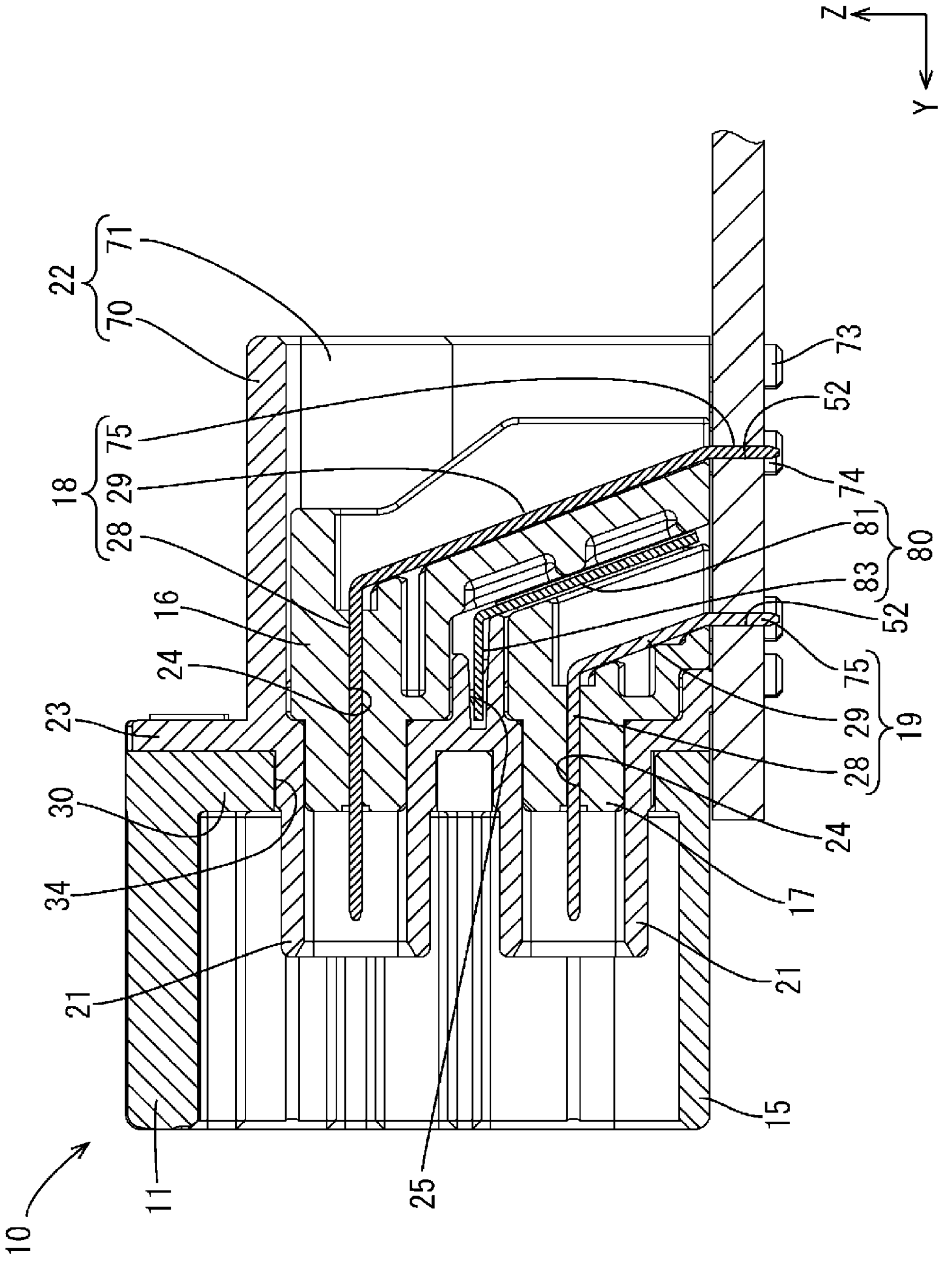
FIG. 11 is a section along XI-XI in FIG. 5.

As shown in FIG. 11, the lower dielectrics 17 are mounted in the tube portion mounting holes 34 provided in the lower stage, out of the tube portion mounting holes 34 formed in the outer conductor 20, and the upper dielectrics 16 are mounted in the tube portion mounting holes 34 provided in the upper stage. The upper and lower dielectrics 16, 17 are formed by injection-molding an insulating synthetic resin. The upper and lower dielectrics 16, 17 respectively include inner conductor through holes 24, through which straight portions 28 of the upper inner conductors 18 and straight portions 28 of the lower inner conductors 19 to be described later are passed in the front-rear direction. A height of the lower dielectric 17 in the vertical direction is smaller than that of the upper dielectric 16 in the vertical direction.

[Inner Conductors]

As shown in FIG. 11, the lower inner conductors 19 are mounted in the lower dielectrics 17, and the upper inner conductors 18 are mounted in the upper dielectrics 16. The lower and upper inner conductors 19, 18 are formed by bending tab-like metal plate materials into a predetermined shape. Each of the lower and upper inner conductors 19, 18 includes the straight portion 28 extending along the front-rear direction (direction along a plate surface of the circuit board 50), and a bent portion 29 bent with respect to the straight portion 28 and extending obliquely to a lower rear side (direction intersecting the plate surface of the circuit board 50). A length of the straight portion 28 of the lower inner conductor 19 is smaller than that of the straight portion 28 of the upper inner conductor 18 in the front-rear direction. A height of the lower inner conductor 19 is smaller than that of the upper inner conductor 18 in the vertical direction.

As shown in FIG. 11, with the upper inner conductor 18 assembled with the upper dielectric 16, a front end part of the straight portion 28 of the upper inner conductor 18 projects further forward than a front end part of the upper dielectric 16. Further, with the lower inner conductor 19 assembled with the lower dielectric 17, a front end part of the straight portion 28 of the lower inner conductor 19 projects further forward than a front end part of the lower dielectric 17. Mating inner conductors (not shown) accommodated in the mating connector can contact the straight portions 28.

As shown in FIG. 11, the bent portion 29 is bent obliquely downward with respect to the straight portion 28 and projects further downward from the lower surface of the connector housing 11. A lower end part of the bent portion 29 is further bent in a direction orthogonal to the circuit board 50 and serves as a board connecting portion 75 to be electrically connected to the signal land 53 formed in the circuit board 50. The board connecting portion 75 is electrically connected to the signal land 53 formed in the circuit board 50 by being inserted into the signal through hole 52 formed in the circuit board 50 and soldered.

[Shield Member 80]

As shown in FIG. 11, a shield member 80 made of metal is disposed between the lower and upper dielectrics 17, 16. The shield member 80 is formed by press-working an electrically conductive metal plate material into a predetermined shape. An arbitrary metal such as copper, copper alloy, aluminum or aluminum alloy can be appropriately selected as a metal for constituting the shield member 80. As shown in FIG. 2, the shield member 80 includes a body portion 81 having a substantially rectangular shape, rear extending portions 82 extending rearward from both left and right side edges of the body portion 81 and a front extending portion 83 extending forward from the upper end edge of the body portion 81.

As shown in FIG. 11, the shield member 80 is press-fit between the side wall 71 and the partition wall 72 from behind. By press-fitting the shield member 80 between the side wall 71 and the partition wall 72, the shield member 80 is held retained in the outer conductor 20 and the shield member 80 and the outer conductor 20 are electrically connected.

As shown in FIG. 11, the outer conductor 20 is formed with a groove portion 25 open rearward between the tube portions 21 provided on an upper side and the tube portions 21 provided on a lower side. A dimension of the groove portion 25 in the vertical direction is set to be equal to or somewhat larger than a thickness of the front extending portion 83 in the vertical direction. The front extending portion 83 of the shield member 80 is press-fit into this groove portion 25 from behind. In this way, the shield member 80 is held not to come out rearward from the outer conductor 20 and the shield member 80 is electrically connected to the outer conductor 20.

[Inner Conductor Pairs]

As shown in FIG. 2, two lower inner conductors 19 are mounted adjacently in the lateral direction in one lower dielectric 17. The two lower inner conductors 19 mounted in one lower dielectric 17 form one lower inner conductor pair 84 (an example of an inner conductor pair). In this embodiment, two lower inner conductor pairs 84 are formed in one board connector 10.

Similarly, two upper inner conductors 18 are mounted adjacently in the lateral direction in one upper dielectric 16. The two upper inner conductors 18 mounted in one upper dielectric 16 form one upper inner conductor pair 85 (an example of the inner conductor pair). In this embodiment, two upper inner conductor pairs 85 are formed in one board connector 10.

[Shield Structure]

As shown in FIG. 11, front half parts of the straight portions 28 of the upper inner conductors 18 and those of the straight portions 28 of the lower inner conductors 19 are covered by the tube portions 21 of the outer conductor 20, thereby being electromagnetically shielded. As a result, the mixing of noise into the parts of the straight portions 28 covered by the tube portions 21 from outside is suppressed, and the leakage of noise from the parts of the straight portions 28 covered by the tube portions 21 to outside is suppressed.

As shown in FIG. 11, rear half parts of the straight portions 28 of the upper inner conductors 18, the bent portions 29 of the upper inner conductors 18 and the bent portions 29 of the lower inner conductors 19 are covered by the inner conductor surrounding portion 22 of the outer conductor 20, thereby being electromagnetically shielded. In particular, the mixing of noise into the parts of the upper inner conductors 18 and the lower inner conductors 19 covered by the inner conductor surrounding portion 22 from outside is suppressed and the leakage of noise from the parts of the upper inner conductors 18 and the lower inner conductors 19 covered by the inner conductor surrounding portion 22 to outside is suppressed by the upper wall 70 and the two side walls 71 of the inner conductor surrounding portion 22.

As described above, since the side wall connecting portions 73 of the two side walls 71 are connected to the ground lands 54 of the circuit board 50, the mixing of noise into the upper and lower inner conductors 18, 19 is further suppressed and the leakage of noise from the upper and lower inner conductors 18, 19 to outside is further suppressed.

Figure 12:
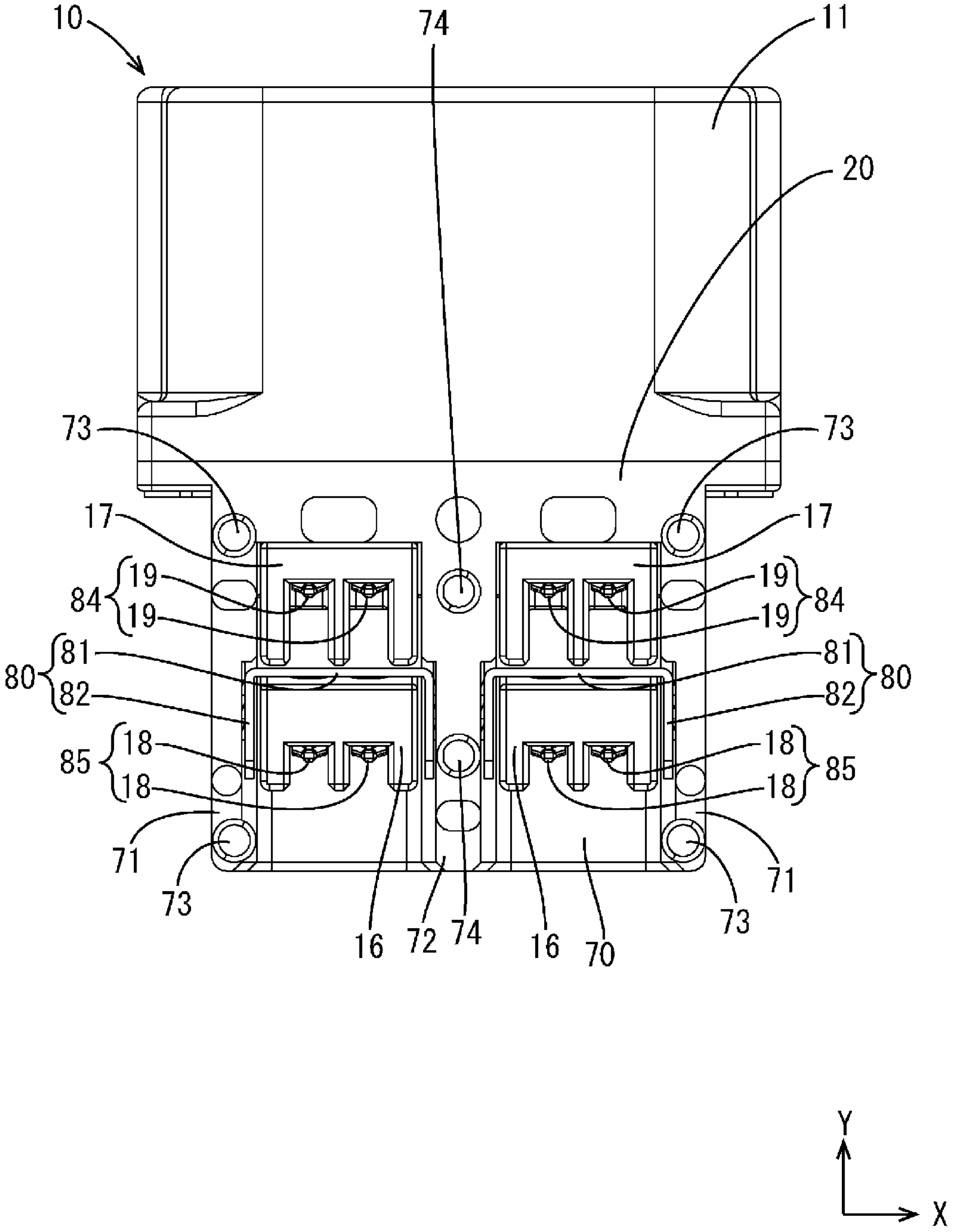
FIG. 12 is a bottom view showing the board connector.

As shown in FIG. 12, the lower inner conductor pair 84 and the upper inner conductor pair 85 disposed on a left side of the board connector 10 and the lower inner conductor pair 84 and the upper inner conductor pair 85 disposed on a right side are partitioned by the partition wall 72. In this way, the leakage of signals between the lower inner conductor pair 84 and the upper inner conductor pair 85 disposed on the left side of the board connector 10 and the lower inner conductor pair 84 and the upper inner conductor pair 85 disposed on the right side is suppressed.

Since the partition wall 72 is electrically connected to the ground lands 54 of the circuit board 50 by the partition wall connecting portions 74, the leakage of signals between the lower inner conductor pair 84 and the upper inner conductor pair 85 disposed on the left side of the board connector 10 and the lower inner conductor pair 84 and the upper inner conductor pair 85 disposed on the right side is further suppressed.

As shown in FIG. 11, the upper inner conductor pair 85 disposed on an upper side of the board connector 10 and the lower inner conductor pair 84 disposed on a lower side are partitioned by the shield member 80. In this way, the leakage of signals between the upper inner conductor pair 85 disposed on the upper side of the board connector 10 and the lower inner conductor pair 84 disposed on the lower side is suppressed.

As described above, since the shield member 80 is electrically connected to the side wall 71 and the partition wall 72 of the outer conductor 20, the leakage of signals between the upper inner conductor pair 85 disposed on the upper side of the board connector 10 and the lower inner conductor pair 84 disposed on the lower side is further suppressed.

As shown in FIG. 1, the four board connecting portions 75 of the lower inner conductors 19 and the partition wall connecting portion 74 provided on a front side of the partition wall 72 are disposed side by side in a row in the lateral direction. Further, the four board connecting portions 75 of the upper inner conductors 18 and the partition wall connecting portion 74 provided on a rear side of the partition wall 72 are disposed side by side in a row in the lateral direction.

Example of Assembly Process of Embodiment

Next, an example of an assembly process of the board connector 10 according to this embodiment is described. The assembly process of the board connector 10 is not limited to the one described below.

The straight portions 28 of the lower inner conductors 19 are press-fit into the inner conductor through holes 24 of the lower dielectrics 17 from behind. The straight portions 28 of the upper inner conductors 18 are press-fit into the inner conductor through holes 24 of the upper dielectrics 16 from behind.

The lower dielectrics 17 are assembled with the outer conductor 20 from behind. In this way, front end parts of the lower dielectrics 17 are press-fit into the tube portions 21 of the outer conductor 20.

The shield members 80 are assembled with the outer conductor 20 from behind. The front extending portions 83 of the shield members 80 are press-fit into the groove portion 25 of the outer conductor 20 and the rear extending portions 82 of the shield members 80 are press-fit between the side walls 71 and the partition wall 72 from behind.

The upper dielectrics 16 are assembled with the outer conductor 20 from behind. In this way, front end parts of the upper dielectrics 16 are press-fit into the tube portions 21 of the outer conductor 20.

The tube portions 21 of the outer conductor 20 are press-fit into the tube portion mounting holes 34 of the connector housing 11 from behind. At this time, the locking protrusions 33 are inserted into the locking recesses 26 of the flange 23.

The rear end parts of the locking protrusions 33 are heated and pressurized, thereby being squashed. In this way, the outer conductor 20 is held retained on the connector housing 11. In this way, the board connector 10 is completed.

The board connector 10 and the circuit board 50 are connected as follows. As indicated by an arrow A in FIG. 1, the board connector 10 is assembled with the circuit board 50 from above. The side wall connecting portions 73 and the partition wall connecting portions 74 are inserted into the ground through holes 51 of the circuit board 50 from above, and the board connecting portions 75 of the bent portions 29 are inserted into the signal through holes 52 of the circuit board 50 from above. Thereafter, the side wall connecting portions 73, the partition wall connecting portions 74 and the board connecting portions 75 are respectively connected to the ground lands 54 and the signal lands 53 by soldering. In this way, the board connector 10 and the circuit board 50 are connected.

Functions and Effects of Embodiment

Next, functions and effects of this embodiment are described. The board connector 10 according to this embodiment is to be connected to the circuit board 50 including the signal lands 53 and the ground lands 54, and provided with the connector housing 11 to be connected to the mating connector, the upper and lower inner conductors 18, 19 to be mounted in the connector housing 11 and connected to the signal lands 53 of the circuit board 50, and the outer conductor 20 to be attached to the connector housing 11 and configured to cover the upper and lower inner conductors 18, 19 while being electrically insulated from the upper and lower inner conductors 18, 19. The outer conductor 20 includes the two side walls 71 and the partition wall 72 disposed between the two side walls 71, between the plurality of upper inner conductors 18 and between the plurality of lower inner conductors 19. The side wall connecting portions 73 to be connected to the ground lands 54 of the circuit board 50 project downward on the lower end parts of the two side walls 71. The partition wall connecting portions 74 to be connected to the ground lands 54 of the circuit board 50 project downward on the lower end part of the partition wall 72.

The upper and lower inner conductors 18, 19 are covered by the side walls 71 connected to the ground lands 54 and the partition wall 72 connected to the ground lands 54 by the partition wall connecting portions 74 connected to the ground lands 54 of the circuit board 50. In this way, electromagnetic symmetry is improved among the side walls 71, the partition wall 72, the upper inner conductors 18 and the lower inner conductors 19. As a result, it is possible to suppress the leakage of signals between the upper inner conductors 18 and between the lower inner conductors 19 partitioned by the partition wall 72. In this way, the communication performance of the board connector 10 can be improved.

Further, according to this embodiment, each of the upper and lower inner conductors 18, 19 includes the board connecting portion 75 to be connected to the signal land 53 of the circuit board 50, and the partition wall connecting portions 74 and the board connecting portions 75 are disposed side by side.

By disposing the partition wall connecting portions 74 and the board connecting portions 75 side by side, the symmetry of the partition wall connecting portions 74 and the board connecting portions 75 is improved. In this way, the leakage of signals between the board connecting portions 75 is further suppressed.

Further, according to this embodiment, the upper and lower inner conductors 18, 19 form the upper inner conductor pairs 85 and the lower inner conductor pairs 84 each composed of the two adjacent upper inner conductors 18 or two adjacent lower inner conductors 19, and the partition wall 72 is disposed between the adjacent upper inner conductor pairs 85 and between the adjacent lower inner conductor pairs 84.

Since the leakage of signals between the adjacent upper inner conductor pairs 85 and the leakage of signals between the adjacent lower inner conductor pairs 84 are suppressed, the communication performance of the board connector 10 can be further improved.

OTHER EMBODIMENTS (1) The outer conductor 20 may be formed by bending a metal plate material.
(2) The locking protrusions 33 of the connector housing 11 may be press-fit into the locking recesses 26 of the outer conductor 20.
(3) Although there are four inner conductor pairs in this embodiment, there is no limitation to this and two, three, five or more pairs may be provided. Three or more inner conductor pairs may be arranged in the lateral direction or three or more inner conductor pairs may be arranged in the vertical direction.
(4) The partition wall connecting portion 74 and the board connecting portions 75 may not be arranged in a row.
(5) One, three or more partition wall connecting portions 74 may be provided.

LIST OF REFERENCE NUMERALS

10: board connector
11: connector housing
15: receptacle
16: upper dielectric
17: lower dielectric
18: upper inner conductor
19: lower inner conductor
20: outer conductor
21: tube portion
22: inner conductor surrounding portion
23: flange
24: inner conductor through hole
25: groove portion
26: locking recess
28: straight portion
29: bent portion
30: back wall
31: lock portion
32: mold removal hole
33: locking protrusion
34: tube portion mounting hole
50: circuit board
51: ground through hole
52: signal through hole
53: signal land
54: ground land
70: upper wall
71: side wall
72: partition wall
73: side wall connecting portion
74: partition wall connecting portion
75: board connecting portion
80: shield member
81: body portion
82: rear extending portion
83: front extending portion
84: lower inner conductor pair
85: upper inner conductor pair

The invention claimed is:

1. A board connector to be connected to a circuit board including an electrically conductive path, comprising:

a connector housing to be connected to a mating connector;

a plurality of inner conductors to be mounted into the connector housing, the inner conductors being connected to the electrically conductive path of the circuit board; and an outer conductor made of metal to be attached to the connector housing, the outer conductor covering the plurality of inner conductors while being electrically insulated from the plurality of inner conductors, the outer conductor including two side walls and a partition wall disposed between the two side walls and between the plurality of inner conductors, side wall connecting portions to be connected to the electrically conductive path of the circuit board projecting on lower end parts of the two side walls, and a partition wall connecting portion to be connected to the electrically conductive path of the circuit board projecting on a lower end part of the partition wall.

2. The board connector of claim 1, wherein:

each of the plurality of inner conductors includes a board connecting portion to be connected to the electrically conductive path of the circuit board, and the partition wall connecting portion and the board connecting portions are disposed side by side.

3. The board connector of claim 1, wherein:

the plurality of inner conductors form a plurality of inner conductor pairs each composed of two adjacent inner conductors, and the partition wall is disposed between adjacent inner conductor pairs, out of the plurality of inner conductor pairs.

* * * * *